United States Patent [19]

Krummacher

[11] 4,014,554
[45] Mar. 29, 1977

[54] BOARD GAME APPARATUS

[76] Inventor: Gottfried Krummacher, Friedrich-Gauss-Strasse 2, 5205 St. Augustin/Sieg-3, Germany

[22] Filed: Mar. 31, 1975

[21] Appl. No.: 563,391

[30] Foreign Application Priority Data

Apr. 17, 1974 Germany .......................... 2418266

[52] U.S. Cl. .................... 273/134 AD; 273/134 C; 273/134 AT
[51] Int. Cl.² ........................................... A63F 3/00
[58] Field of Search .................................... 273/134

[56] References Cited

UNITED STATES PATENTS

| | | | |
|---|---|---|---|
| 2,691,528 | 10/1954 | Laidlaw | 273/134 AF |
| 3,539,189 | 11/1970 | Shelton | 273/134 AF |
| 3,765,682 | 10/1973 | Braude | 273/134 AF |
| 3,799,552 | 3/1974 | Leferre et al. | 273/134 AF |
| 3,801,104 | 4/1974 | Potts et al. | 273/134 AE |

*Primary Examiner*—Delbert B. Lowe
*Attorney, Agent, or Firm*—Toren, McGeady and Stanger

[57] ABSTRACT

An instructional game for learning the interrelations in a free-market economy on the basis of a game with dice and a board with playing spaces on its border for playing pieces is disclosed. The individual spaces are provided with different markings. A center market area for the deposit of counters is provided in the interior of the board which is enclosed by the playing spaces, the center area being subdivided into a plurality of subsidiary areas each of which has assigned to it a monetary value. One or more packs of cards is provided each consisting of a plurality of play variation cards, the marking on the backs of the cards being uniform in the pack. A proportion of the playing spaces carries reference markings which correspond with the marking used for the market area and a further proportion of the playing spaces carries reference markings respectively corresponding in each case to the marking on the backs of one pack of cards.

7 Claims, 2 Drawing Figures

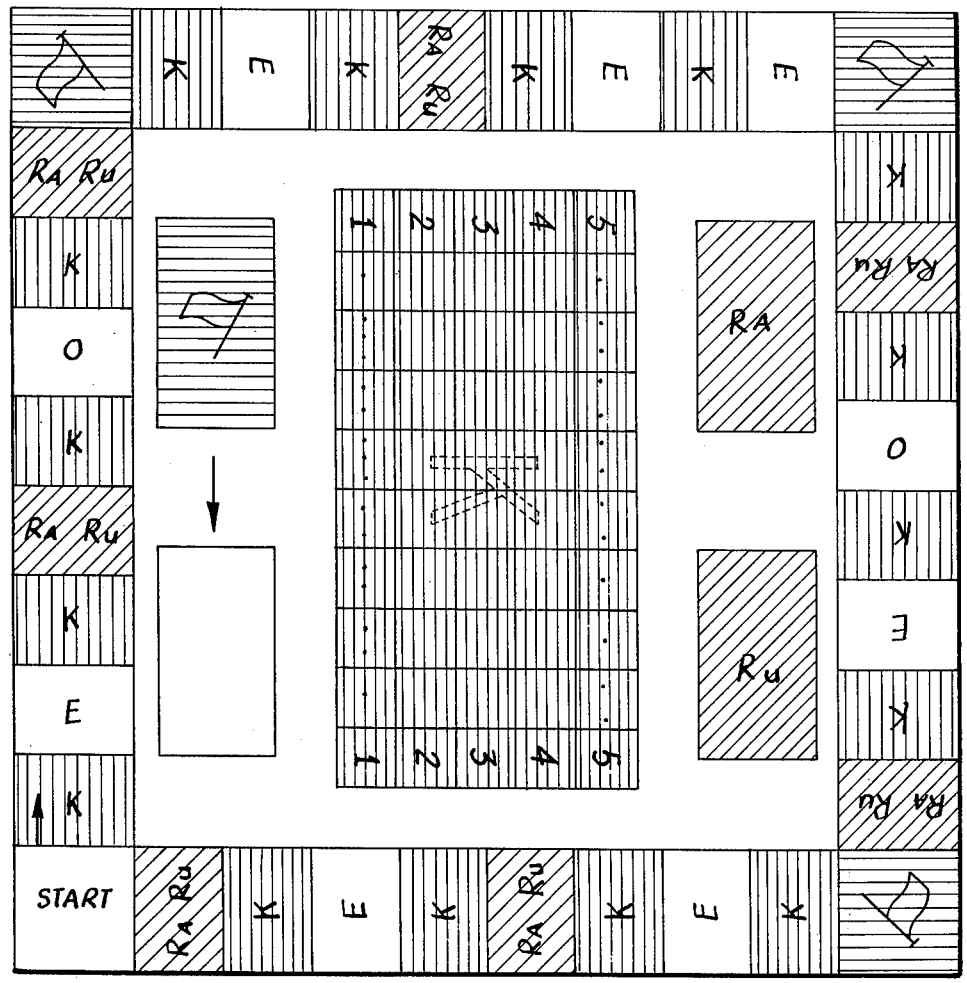

BOARD GAME APPARATUS

The invention relates to an instructional game for learning the interrelations in a free-market economy, based on dice throwing with a board on the margin of which are playing spaces for placing pieces, the individual spaces being given different markings.

Games are already known which are played substantially according to assumed economic situations. However, as a general rule these games are limited simply to the facts of buying, selling and use of capital. One of the drawbacks to these known types of game consists in the fact that they give little attention to the interrelationship of economic functions, taking into consideration neither the effect of the decisions and risks of management nor Government actions which are binding on the economy as a whole.

The problem underlying the invention is to create an instructional game which seeks to demonstrate the influence of many kinds of factors in the market, the effects of casual situations on economic conditions being simulated by means of an ordinary die.

According to the present invention there is provided an instructional game for learning the interrelations in a free-market economy on the basis of a game with dice and a board with playing spaces on its border for playing pieces, the individual spaces being provided with different markings, wherein a centre market area for the deposit of counters is provided in the interior of the board which is enclosed by the playing spaces, said centre area being subdivided into a plurality of subsidiary areas each of which has assigned to its a monetary value, and wherein furthermore one or more packs of cards is provided each consisting of a plurality of play variation cards, the marking on the backs of the cards being uniform in the pack, and wherein a proportion of the playing spaces carries reference markings which correspond with a ground marking of the market area and a further proportion of the playing spaces carries reference markings respectively corresponding in each case to the back marking of one pack of cards.

By the combination of a market on which the goods available are visible to all the players, with the value, or price, assigned to them by the values marked on the individual subsidiary area on the one hand and the so-called play variation cards which carry economically relevant data or information in accordance with the basic idea of the game, on the other, it is possible to demonstrate very clearly the fundamental interrelations and problems of a free-enterprise economy.

The effects of a decision as an employee or manager, the decision to produce goods or simply to deal in goods, the influence of supply and demand, overproduction and shortage of goods, with the resultant rise or fall in price, as well as the influence of Government actions affecting the whole economy, that is to say binding on all the players, can be represented particularly advantageously by means of this novel form of play.

The advantage of this arrangement over previously known games resides in the fact that, by the creation of a market, starting from a predetermined quantity of goods it is possible to show visually and impressively the various influences of free-enterprise situations on the market, that is to say on an increase or a drop in the quantity of goods available, on the one hand, and the rise or fall in price corresponding to this, while depending on the information given by the associated play variation cards, certain economic situations can be simulated and played through in respect of their economic consequences.

In an advantageous development of the invention it is here provided that the corresponding markings on the spaces, the market and/or deposit spaces for play variation cards and/or the back markings of the play variation cards are in the same colouring respectively. This makes it easy and simple to associate the space in question with its corresponding means of playing, thus facilitating the playing of the game.

As a development of the invention it is provided that the greater part of the spaces shall be marked in association with the market area. This demonstrates vividly that buying is the economic measure which is most frequently encountered and is also the most important, that is to say the withdrawal of goods from the market.

In a further development of the invention a small number, preferably about 1/5 of the spaces, is given no associated marking and these spaces are distributed over the periphery. In accordance with the fortuitousness of the throw of the dice, the possibility is given to the individual player on these spaces to make a choice in each case between various decisions of economic relevance which are assumed, for example, in a special board such as, for instance, the purchase of a machine, the production of goods, the sale of goods, and the buying or selling of assets. The allocation of only a small number of these free spaces simulates advantageously the limited possibility which actually occurs of making decisions of this kind.

A further provision of another development of the invention is at least one marked area in the centre of the board for the deposit of play variation cards, its marking corresponding both with the marking of some of the spaces and also with the marking on the back of a pack of cards. With this arrangement, in which as far as possible only a very small proportion of the available spaces should be given such markings, it is possible to bring into the game certain conditions, binding on all players, which are visible and recognizable by each player, by means of the variations in play which come into action at any given time during the game.

Another provision of a preferred embodiment of the invention is for a pack of play variation cards which carries features of intervention, which can be made by the Government only, on the front of the card and different in each case. Another development provides for a pack of play variation cards with different risk features relative to management on the front of the cards. Finally, another development provides a pack of play variation cards carrying features of situations relative to employees, all different, on the front of the cards. Since each pack of play variation cards has to have a different marking on the backs, corresponding in each case with only a proportion of the markings on the spaces on the board, this produces a fortuitous association, brought about by the chance of the dice throw, of the play variation cards binding on the player concerned.

A particularly advantageous development provides that the different features on the play variation cards shall take the form of pictograms. This development is a considerable improvement as regards clarity, which is important particularly when a larger number of players is taking part.

As a development of the invention it is provided, finally, that there shall be at least one and at most four spaces, distributed on the periphery of the board, with a marking corresponding to the marking of the play variation cards for "Government interventions." This is intended to ensure that the actions of the Government affecting the economy as a whole and binding, of course, on all the players shall remain in force for a fairly lengthy period, as they would in reality, so as to draw attention to the long-term influences of such actions, but also not to do away with the rises and falls in the market situation which are influenced by supply and demand, that is to say by the individual players.

Preferred embodiments of the invention will be described more fully with reference to the accompanying drawing which is a plan view of a playing board;

The board shown in the drawing has playing spaces for the playing pieces running around its border. The central area enclosed by the spaces comprises a middle area, subdivided into a plurality of subsidiary areas, for placing counters, known as the market, its individual subsidiary areas being given value markings, for example the markings 1 to 5.

Besides the market there are also four deposit spaces for the individual packs of the so-called play variations cards. In this connection the deposit space shown by a flag symbol is used for placing (face downward) play variation cards carrying Government intervention features. The empty space located beside this deposit space is used for depositing the so-called Government cards which are turned up at times during the course of the game so that the generally applicable regulations can be seen by every participant in the game.

The individual playing spaces are provided with markings which, in the example shown, are put in the form of letters for the sake of greater clarity. Instead of letters, however, a different coluring may be used in each case for the individual spaces, or else certain emblems might be shown in the form of pictograms. The important point here is that a proportion of the spaces, and indeed most of them (shown by the letter K) have the same marking as the so-called market so that a distinct assocation is immediately recognizable from the association applicable to the individual playing pieces at any time.

Another group of spaces is identified by the letters RA and RU, to which are assigned respectively according to the progress of the game the two deposit spaces RA and RU and the packs of card RA and RU respectively belonging to them, these packs of cards bearing corresponding markings on the back. Here, again, the marking with letters may be replaced by a suitable colouring or by a suitable pictogram.

A further group of spaces, identified by the letter E, or by a suitable colour or a suitable pictogram, represent the so-called free, or decision spaces which give the player the chance of making a freely chosen decision according to the agreed or stated rules of the game.

Finally, two further spaces are provided, marked with a circle, with which certain situations can be associated in accordance with the rules of the game, for example dealing on the stock market, or the like.

Apart from this board arrangement three packs of cards must also be provided in the example described with the so-called play variation cards and, depending on the aim, namely to bring as many types of action as possible relevant to free-market enterprise into the course of the game, one pack must bear on its front intervention features relevant to the economy which can only be made by the Government. These features symbolize, for example, Government measures for the encouragement of investment, rising or falling world market prices, raising or lowering of the rate of interest, credit relaxation or credit squeezes, modification of import quotas, or the like. On the back this pack has as its marking, corresponding to the example of the board, the same flag marking as the three spaces at the corners of the board and the associated deposit space. In place of the flag symbol shown, which may be in the national colours for example, other symbols may also be used, for example, coats of arms or the like, indicating this relation.

In another packs of cards, namely that with the RU back marking, different features indicating risks appertaining to management are shown on the fronts of the cards.

Finally, in a third pack of cards bearing the back marking RA different features are provided on the fronts of the cards indicating situations relating to employees.

For situations relating to management there may be, for example, fluctuations in the exchange rate in the case of exporters, shortages of raw materials, payment of taxes in advance, measures for the making of wealth, extra tax payments, unusual income, for example, from inventions or the like. Situations relating to employees may include additional wage or salary payments, overtime, dismissal without notice, overdrawn accounts, loss of Christmas bonus, or similar typical features.

In order that an economic transaction may be represented there must be at least two players. To play the game all the subsidiary areas of the market are covered with counters, designated as goods counters. After each player has been given a starting capital the moves of the various playing pieces are decided by throwing the dice. If the player concerned lands on a space marked K he has to buy a counter from the market, paying the value indicated in the respective subsidiary field for it, the appropriate money being paid into the bank of the Director of the Board, or Banker. It is advisable for the player to buy the goods with the lowest value in each case.

If the player lands on a space marked E, he has the possibility of making a free decision of economic relevance; for example, if as a manager he wishes to produce goods, or only wishes to deal in goods, or if as an employee he wants to take a special course of further education, or similar relevant actions. All this can be agreed beforehand in accordance with the standard of difficulty which is desired.

Now, if a player lands on a space marked RA or RU, he must draw a play variation card, depending on his position as a manager or an employee, from those in the space RA or RU and this card will give him relevant situations or data for management or labor determining his further play.

When a player lands on one of the corner spaces marked with a flag, a card is turned up from the pack of play variation cards which have the corresponding back marking and this card is put down, face upward, on the blank space at the side. The Government interventions shown on this card are now binding on all the players so that as a result the data shown per se by the situation cards marked RA or RU are modified accordingly or else the scope of decision for a player on the space marked with an E is reduced or expanded.

It can now be seen easily that through the possibilities provided by the game for buying goods and taken them off the market, or introducing them to the market as a manufacturer or dealer, the interplay of supply and demand and its effect on the market as limited by the subsidiary areas of the market area can be demonstrated to the players and at the same time the relation between supply and demand, on the one hand, and the level of fluctuating prices, on the other, can be shown by means of the particular set-out of the board. On the other hand, by means of the corresponding markings of the spaces with reference to the elements of play involved at any particular time the economic data effective at any time for all players or for only one also be demonstrated.

What I claim is:

1. An instructional game for learning the interrelations of a free-market economy comprising a board having a closed circuit of individual serially arranged playing spaces, a plurality of playing pieces movable over said closed circuit, the individual playing spaces each having a marking with a number of different markings being provided for said playing spaces, a market area provided on the board and enclosed by said closed circuit of said playing spaces, said market area having a marking and being subdivided into a plurality of subsidiary areas, a plurality of counters sufficient to provide one said counter for each said subsidiary area, said counters being removably positionable on said subsidiary areas, at least one pack of cards positionable on said board and consisting of a plurality of play variation cards, each of said cards having a front and a back with the same marking on the backs of the cards in said pack and the marking being different from the marking of said market area, a partial number of the playing spaces having a marking which corresponds with the marking of said market area and another partial number of the playing spaces having a marking corresponding to the back marking of said at least one pack of cards, and means operable by a player for determining the number of playing spaces to be moved by the player's playing piece.

2. An instructional game, as set forth in claim 1, wherein a variety of color markings are used on said playing space, and said market area and said at least one pack of cards each having a different color marking corresponding to one of the color markings on said playing spaces.

3. An instructional game, as set forth in claim 1, wherein the number of said playing spaces having markings corresponding to the markings of said market area is greater than any other group of said playing spaces each of which has the same but a different marking from that of said market area.

4. An instructional game, as set forth in claim 1, wherein at least one space is provided on the board inwardly of said closed circuit of said playing spaces for the deposit of said at least on pack of cards, said space having a marking corresponding to the marking of a number of said playing spaces and also to the marking on the backs of the cards in said at least on pack of cards.

5. An instructional game, as set forth in claim 1, wherein at least two packs of cards are positionable on said board with each consisting of a plurality of play variation cards, each of said cards having a front and a back with the cards in one of said packs having the same marking on the backs thereof which marking is different from the marking on the backs of the other said pack.

6. An instructional game, as set forth in claim 1, wherein said means operably by a player comprises dice.

7. An instructional game, as set forth in claim 1, wherein said closed circuit of said playing spaces extends around the border of said board.

* * * * *

UNITED STATES PATENT OFFICE
CERTIFICATE OF CORRECTION

Patent No. 4,014,554      Dated March 29, 1977

Inventor(s) Gottfried Krummacher

It is certified that error appears in the above-identified patent and that said Letters Patent are hereby corrected as shown below:

In the heading of the patent [30] should read as follows:

--[30] Foreign Application Priority Data

Apr. 16, 1974    Germany......P 2418266--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*